(12) United States Patent
Weiser et al.

(10) Patent No.: US 8,776,998 B2
(45) Date of Patent: Jul. 15, 2014

(54) CONVEYOR BELT AND MODULE WITH HOOKED CONNECTION AND ASSOCIATED METHOD

(75) Inventors: David C. Weiser, River Ridge, LA (US); Gilbert J. MacLachlan, Harahan, LA (US); Terral A. Ridgell, Tickfaw, LA (US)

(73) Assignee: Laitram, L.L.C., Harahan, LA (US)

( * ) Notice: Subject to any disclaimer, the term of this patent is extended or adjusted under 35 U.S.C. 154(b) by 550 days.

(21) Appl. No.: 13/083,665

(22) Filed: Apr. 11, 2011

(65) Prior Publication Data

US 2011/0278136 A1    Nov. 17, 2011

Related U.S. Application Data

(63) Continuation-in-part of application No. 12/858,769, filed on Aug. 18, 2010, now Pat. No. 8,578,104, which is a continuation-in-part of application No. 12/779,525, filed on May 13, 2010, now abandoned.

(51) Int. Cl.
*B65G 17/06*    (2006.01)

(52) U.S. Cl.
USPC .............................. 198/850; 198/851; 198/852

(58) Field of Classification Search
None
See application file for complete search history.

(56) References Cited

U.S. PATENT DOCUMENTS

| | | |
|---|---|---|
| RE30,035 E | 6/1979 | Miller |
| 4,949,838 A | 8/1990 | Lapeyre et al. |
| 4,972,942 A | 11/1990 | Faulkner |
| 4,974,724 A | 12/1990 | Lapeyre |
| 5,083,660 A | 1/1992 | Horton |
| 5,156,262 A | 10/1992 | Horton |
| 5,224,583 A | 7/1993 | Palmaer |
| 5,332,084 A | 7/1994 | Greve |
| 5,598,916 A | 2/1997 | Horton |
| 5,906,270 A | 5/1999 | Faulkner |
| 5,921,379 A | 7/1999 | Horton |
| 6,036,001 A | 3/2000 | Stebnicki et al. |
| 6,216,854 B1 | 4/2001 | Damkjaer et al. |
| 6,345,715 B2 | 2/2002 | Palmaer |
| 6,357,581 B1 | 3/2002 | Guldenfels |
| 6,814,223 B1 | 11/2004 | Verdigets et al. |
| 6,837,367 B1 | 1/2005 | Klein et al. |
| 6,997,309 B2 * | 2/2006 | Stebnicki et al. ............. 198/850 |
| 7,070,043 B1 | 7/2006 | MacLachlan et al. |
| 7,073,662 B2 | 7/2006 | Neely et al. |
| 7,377,380 B2 | 5/2008 | Menke et al. |
| 7,635,060 B2 | 12/2009 | Lagneaux |
| 2010/0025200 A1 | 2/2010 | Fandella |

OTHER PUBLICATIONS

Intralok L.L.C.,"Product Line Extension: Series 9000 Flush Grid" Brochure, copyright 2009, pp. 1-2, Intralox, L.L.C., Harahan, Louisiana, U.S.A.

International Search Report and Written Opinion of the ISA/EP for International Patent Application No. PCT/US11/31822, mailed Jul. 13, 2011, European Patent Office, Rijswijk, NL.

* cited by examiner

*Primary Examiner* — Kavel Singh
(74) *Attorney, Agent, or Firm* — James T. Cronvich

(57) ABSTRACT

A modular plastic conveyor belt constructed of belt modules having hooked structure to hold belt rows together during splicing for easier hinge-rod insertion and to accommodate an elongated belt edge portion permitting hinge-rod growth and a method for splicing such a belt together. The modules include a pivot end that hooks into a mating receptacle on the module of a consecutive belt row. An aperture through the receptacle and the pivot end is aligned with the apertures of other hinge elements to form a lateral passageway for a hinge rod.

15 Claims, 5 Drawing Sheets

CONVEYOR BELT AND MODULE WITH HOOKED CONNECTION AND ASSOCIATED METHOD

CROSS-REFERENCE TO RELATED APPLICATIONS

This application is a continuation-in-part of co-pending U.S. patent application Ser. No. 12/858,769, "Conveyor Belt and Module Accommodating Rod Growth," filed Aug. 18, 2010, which is a continuation-in-part of U.S. patent application Ser. No. 12/779,525, "Conveyor Belt and Module Accommodating Rod Growth," filed May 13, 2010, now abandoned. The disclosures of both applications are incorporated entirely in this specification by reference.

BACKGROUND

The invention relates generally to power-driven conveyors and more particularly to modular plastic conveyor belts and modules and methods for splicing such belts together on a conveyor.

Modular plastic conveyor belts are constructed of a series of rows of one or more belt modules linked together end to end by hinge rods received in the interleaved hinge eyes of consecutive rows. One use for a modular plastic conveyor belt having a lot of open area for good air flow is as a cooling belt for rubber extrusions, such as tire tread and sidewall extrusions. Hinge rods made of polypropylene or acetal are commonly used in modular plastic belts and tend to wear out fairly quickly in abrasive environments, such as in a rubber-processing or tire plant's cooling line. Hinge rods made of certain nylon materials, such as nylon 6-6, have been shown to markedly increase rod life. As a consequence, nylon hinge rods are sometimes used in cooling belts. But, to hasten cooling, water is sprayed on the tire components as they are conveyed on the cooling belt. The nylon hinge rods absorb water, which causes them to grow in diameter and length. If the ends of the rods are not confined by the belt structure, the ends can grow past the outside edges of the belt and snag people or things alongside the conveyor. If the ends are confined by structure in the edges of the belt, the growing rods can push against and deform or break the edges of the belt. Sometimes the nylon hinge rods are cut short in order to accommodate the expected growth. In this case, the rods could be significantly short on wide belts, which would leave several links on the outside edge of the belt without rods. This leaves those links vulnerable to damage and reduces the effective pull strength of the belt. Thus, there is a need for a conveyor belt that can accommodate hinge-rod growth.

Another problem arises in the splicing of modular plastic conveyor belts in the field during initial installation or after repair. It is especially difficult to splice a belt together while simultaneously removing slack from the returnway—slack that is necessary to develop the back tension required in a low-tension belt conveyor. Typically, two hands are required to hold the ends of the belt together while interleaving the hinge eyes along the unconnected ends of the belt so that apertures through the interleaved hinge eyes are aligned to form a continuous passageway for a hinge rod, which must then be inserted in and pushed through the passageway by a third hand to splice the belt together. Thus, there is a need for easing the splicing of modular conveyor belts.

SUMMARY

A conveyor belt module embodying features of the invention comprises a first end and a longitudinally opposite second end, each extending laterally from a first side to a second side. A first set of hinge elements are spaced apart laterally along the first end with spaces between consecutive hinge elements. Aligned apertures form a first lateral passageway through the first set of hinge elements that extends from the first side to the second side. A second set of hinge elements are spaced apart laterally along the second end with spaces between consecutive hinge elements. At least one pair of consecutive hinge elements of the first set has confronting lateral protrusions at their distal ends that form a narrow slot opening into the space between the pair of consecutive hinge elements. At least one hinge element of the second set has an arm that extends longitudinally to an enlarged pivot end. The lateral width of the arm is less than the lateral width of the slot, which is less than the lateral width of the enlarged pivot end, which is less than the lateral width of the space.

In another aspect of the invention, a method for splicing a conveyor belt together on a conveyor comprises: (a) pulling the opposite ends of a conveyor belt together until the ends overlap; (b) hooking enlarged pivot ends along one end of the conveyor belt into receptacles along the opposite end to align apertures in interleaved hinge elements along the ends to form a lateral passageway; and (c) inserting and pushing a hinge rod through the lateral passageway to connect the ends of the belt together.

BRIEF DESCRIPTION OF THE DRAWINGS

These aspects and features of the invention, as well as its advantages, are better understood by reference to the following description, appended claims, and accompanying drawings, in which:

DETAILED DESCRIPTION

Figure 1:
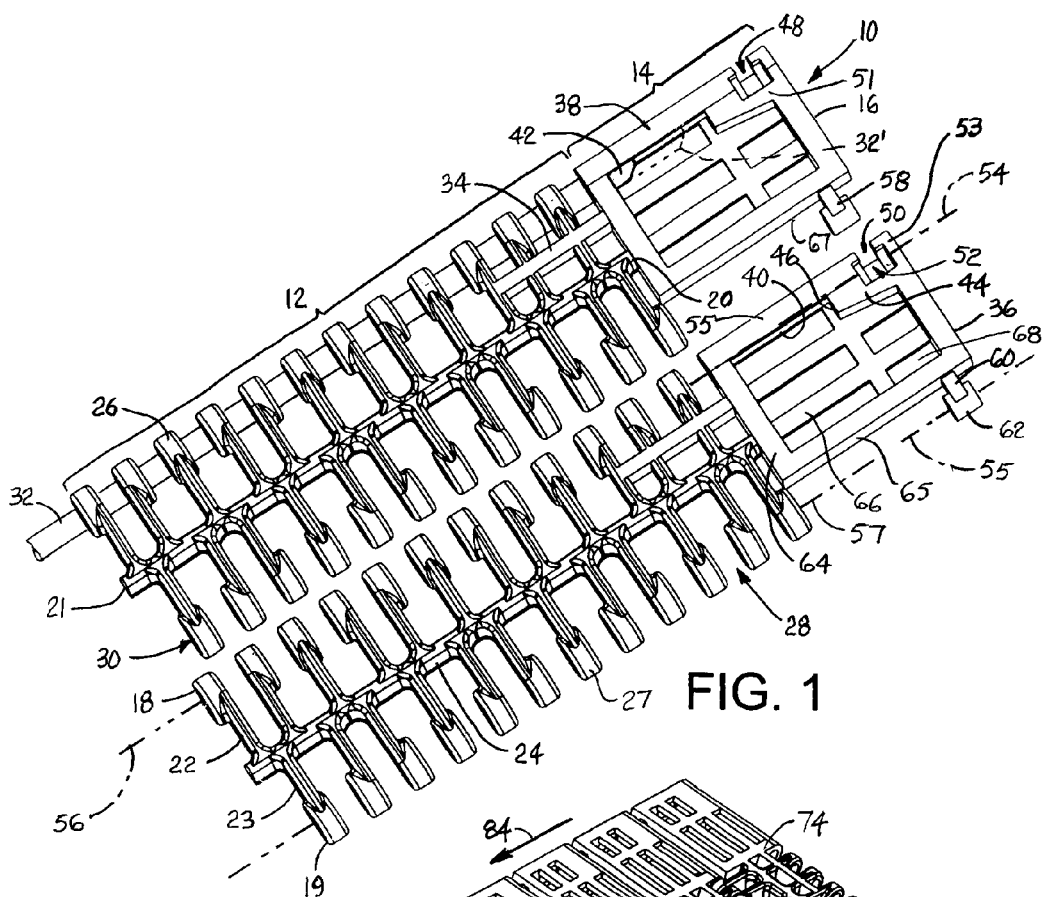
FIG. 1 is a bottom axonometric view of two belt-edge modules embodying features of the invention.

Two consecutive edge modules embodying features of the invention and suitable for use in a conveyor belt in a cooling line are shown in FIG. 1. Each belt module is an edge module 10 having a main portion 12 and an edge portion 14 forming an outside edge 16 of the module. The module extends longitudinally, i.e., in the direction in which a conveyor belt made of the modules would travel, from a first end 18 to an opposite second end 19 of the module. The main portion 12 extends laterally, i.e., along the width of a conveyor belt made of the modules, from a first side 20 to an opposite second side 21. First and second sets of links 22, 23 extend longitudinally from opposite sides of a lateral rib 24 in the main portion 12 of the belt module. The lateral rib forms a central spine of the main portion of the module midway between the first and second ends and can also serve as a drive bar against which teeth of a drive sprocket drive a belt made of these modules. The first and second sets of links 22, 23 terminate in link ends that serve as hinge elements 26, 27 at the first and second ends 18, 19 of the module. The hinge elements 26 along the first end of the module are offset from the hinge elements 27 along the second end so that the first set of hinge elements 26 can be interleaved with the second set of hinge elements 27 in an adjacent module with the outside edges 16 of the modules in longitudinal alignment. Spaces 28 between laterally consecutive hinge elements on each end of the module are greater than the thicknesses of the hinge elements to allow the hinge elements to interleave. Apertures 30 through the hinge elements are aligned laterally and form a lateral passageway with the apertures in the interleaved hinge elements of an adjacent module. A hinge rod 32 received in the lateral passageway between two adjacent modules connects the modules together at a hinge joint at which the modules 10 can articulate about a drive or idle sprocket or a return roller or shoe.

The edge portion 14 of the edge module 10 is attached to the first side 20 of the main portion 12. The lateral rib 24 and a lateral stiffening bar 34, which traverses several of the links 22 between the central rib and the first end 18 of the module, connect the edge portion to the main portion of the module. The stiffening bar, besides increasing the beam stiffness of the module near the first side, provides additional cantilever support to the edge portion 14 to prevent it from twisting about the lateral rib 24.

The edge portion 14 extends outward from the first side 20 of the main portion 12 to its distal outside edge 16, which has an outwardly facing wall 36 that gives a belt made of these edge modules a flush edge. The edge portion is generally rectangular and has a laterally elongated link end 38 at the first end 18 of the module. The elongated link end has a concave inner surface 40, which nestles the end 42 of the hinge rod. A thickened region 44 extending to the outside edge 16 has an interior surface 46 that is laterally aligned with the hinge rod 32 and the lateral passageway. The surface 46 is spaced from the main portion 12 by a distance great enough to allow the hinge rod to lengthen without contacting the surface and pushing outwardly against it. This distance may be as much as about one inch.

In a normal belt construction, the end 42 of the headless hinge rod resides in the edge portion 14 to ensure that the rod extends through all the hinge elements of the main portion 12. A dry rod extends slightly into the edge portion. A wet rod 32' that has absorbed a lot of water extends farther into the edge portion, but not far enough to contact the surface 46 and cause the module to distort or break. Thus, the edge portion provides an unimpeded axial growth path for a hinge rod.

The thickened region 44 of the edge portion also provides enough material for a receptacle 48 to be formed in the elongated link end 38 of the edge portion 14. The receptacle has a slot 50 that opens onto the elongated link end in the bottom 51 of the edge portion and that forms with the receptacle a space dividing the elongated link end 38 into two hinge elements: an outer-edge hinge element 53 and a wider inner hinge element 55. The slot, which communicates with an open cylindrical cavity 52 that opens onto the bottom of the edge portion, has an axis 54 aligned with the hinge axis 56 of the aligned apertures of the first set of hinge elements 26 along the first end 18 of the module. A complementarily shaped pivot member 58 extends longitudinally outward from the end portion 14 longitudinally aligned opposite the receptacle to form a hinge element without a pivot-rod aperture. The pivot member and the receptacle are aligned longitudinally in the edge portion of the module proximate the outside edge 16. The pivot member 58 has a longitudinally extending arm 60 that terminates in an enlarged pivot end 62, which has a lateral pivot axis 55 aligned with the hinge axis 57 formed by the aligned apertures through the hinge elements 27 along the second end 19 of the module. The slot 50 admits the arm 60 of the pivot member of an adjacent module, and the cavity 52 receives the pivot end 62 and allows it to pivot in the cavity in line with the hinge rod. The pivot connection also hooks the edge portions of adjacent modules together near the outside edge to prevent them from separating.

The edge portion 14 also includes longitudinal and lateral frame sections 64, 65 that join with the outside edge wall 36 and the elongated link end 38 to form an outer frame. A top deck 66 with openings 68 provides a support surface on the conveying side 67 of the edge portion with plenty of open area for air to flow through the edge portion.

The modules may be made of thermoplastic materials, such as polyethylene, polypropylene, acetal, or composite polymers in an injection-molding process. The hinge rod is made of a durable, abrasion-resistant material, such as nylon 6-6, which also tends to absorb water and to lengthen.

Figure 5:
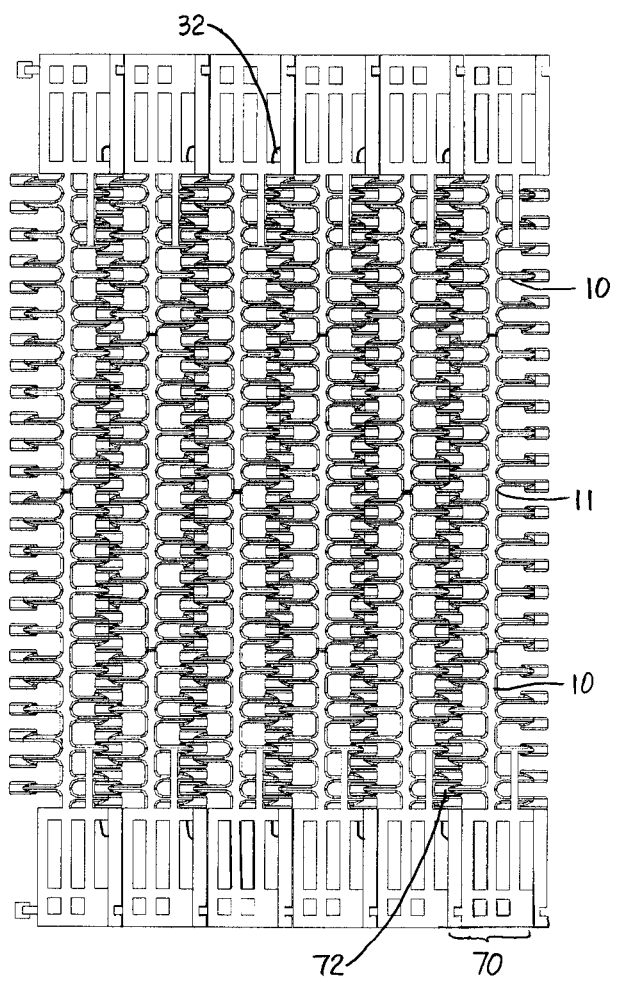
FIG. 5 is a top plan view of the full width of a portion of the conveyor belt of FIG. 2.

The edge modules 10 shown in FIG. 1 are joined side by side with other edge modules and interior modules 11 which do not include edge portions, to form a belt row 70, as shown in FIG. 5. Consecutive rows of belt modules are joined end to end at hinge joints 72 by hinge rods 32 received in the interleaved hinge elements of adjacent rows to form an endless conveyor belt 74.

Figure 2:
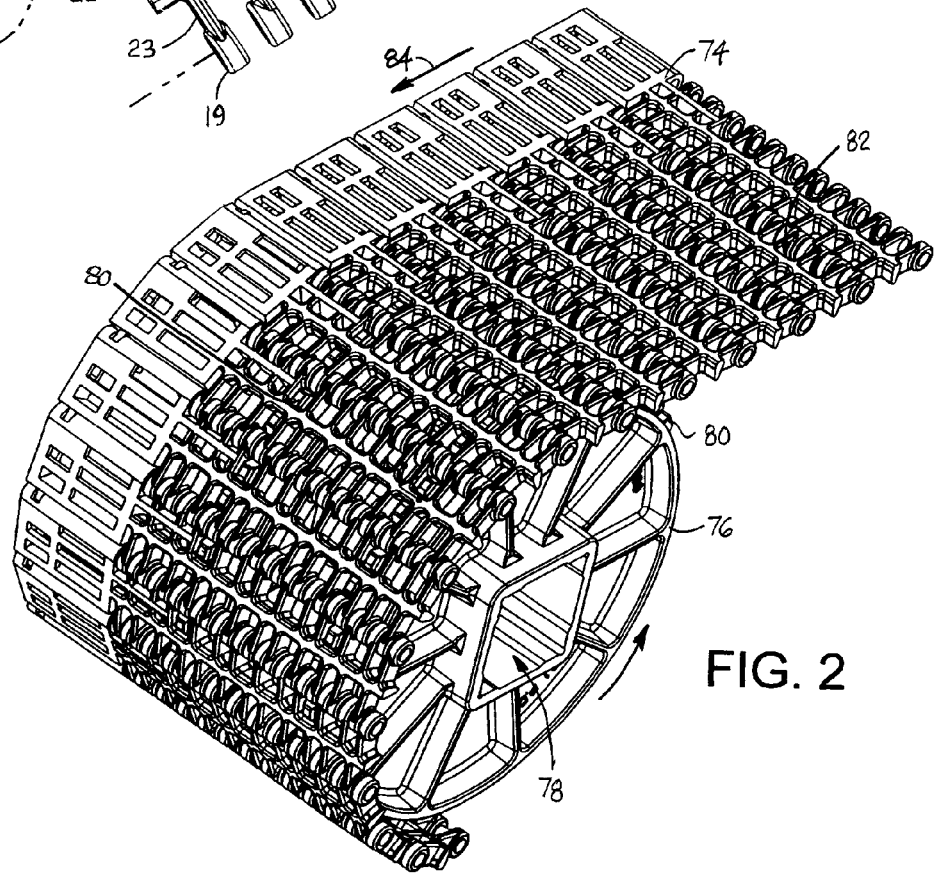
FIG. 2 is an isometric view of a portion of a conveyor belt constructed of belt-edge modules as in FIG. 1.
Figure 3:
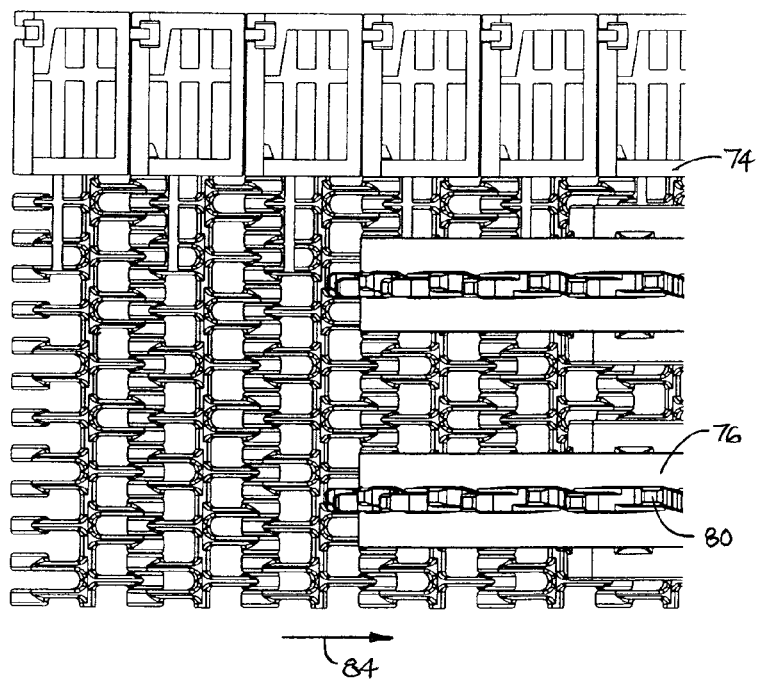
FIG. 3 is a bottom plan view of the conveyor belt of FIG. 2.
Figure 4:
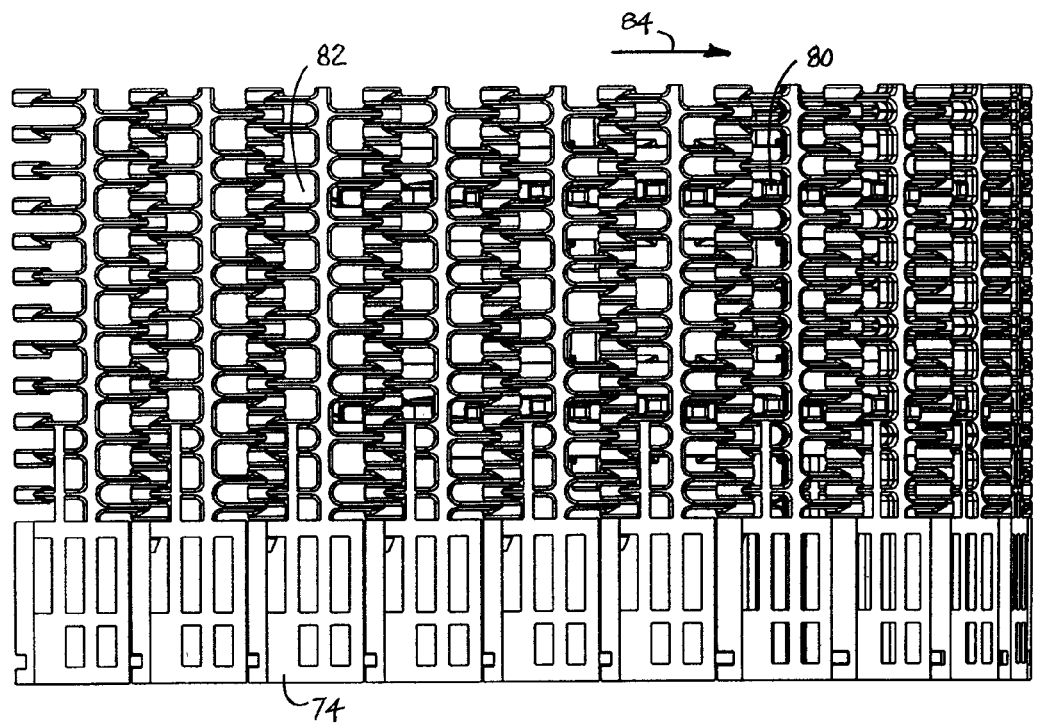
FIG. 4 is a top plan view of the conveyor belt of FIG. 2.

As shown in FIGS. 2-4, which depict one side of the belt, the belt 74 is wrapped around a set of drive sprockets 76 having bores 78 for mounting on a shaft rotated by a motor (not shown). Sprocket teeth 80 on the periphery of the drive sprocket extend into gaps 82 between the lateral rib 24, or drive bar, and the hinge elements of an adjacent module and push against the drive bar to move the belt in a direction of belt travel 84 as the sprockets rotate. The endless belt loop is trained between drive sprockets 76 and similar idle sprockets (not shown).

Figure 6A:
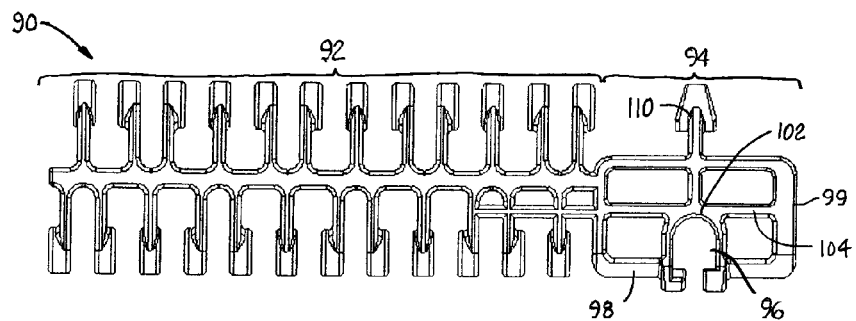
FIGS. 6A and 6B are top and bottom plane views of another version of an edge module embodying features of the invention.
Figure 6B:
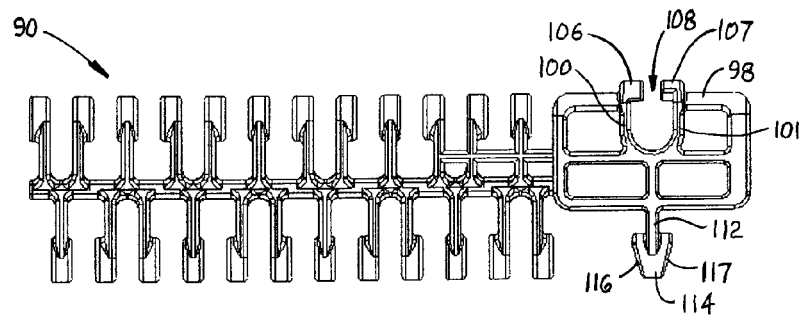

Another version of an edge module that can be connected together with other modules and hinge rods to construct a conveyor belt as in FIGS. 2-4 is shown in FIGS. 6A and 6B. The edge module 90 comprises a main portion 92, which is shown as identical to the main portion 12 of the edge module 10 of FIG. 1, and an edge portion 94, which differs from the edge portion 14 of the edge module of FIG. 1. In the edge portion 94, a horseshoe-shaped receptacle 96 is positioned generally midway along a laterally elongated link end 98, but it could be closer or farther from the outside edge 99 of the module. The receptacle 96 forms a space separating the link end 98 into two hinge-element segments that extend laterally from opposite side walls 100, 101 of the receptacle. The rounded closed end 102 of the horseshoe-shaped receptacle 96 is formed with a strengthening rib 104 that extends laterally across the edge portion 94. Protrusions 106, 107 at the open end of the receptacle extend toward each other from opposite side walls 100, 101. The confronting faces of the protrusions are separated by a slot 108 opening into the receptacle. A hinge element in the form of a pivot member 110 extends longitudinally outward from the opposite end of the edge portion 94. Like the pivot member 58 of the edge module 10 in FIG. 1, the pivot member 110 has a longitudinally extending arm 112 that terminates in an enlarged pivot end 114 with a rounded outer surface. Opposing sides 116, 117 of the pivot end 114 are angled to converge with distance from the arm 112. Thus, the pivot end is thicker at its junction with the arm. The pivot member's arm 112 is aligned longitudinally with the slot 108 at the open end of the receptacle 96. Although the edge module 90 is shown with one pivot member and one receptacle, the module could have two or more of each spaced along the width of the edge portion.

Figure 7A:
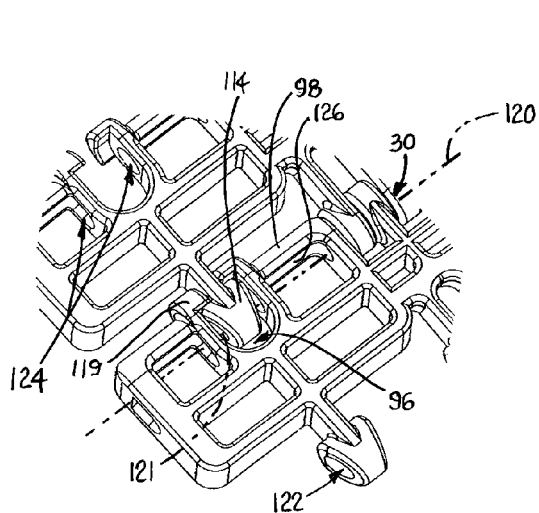
FIGS. 7A and 7B are top and bottom enlarged axonometric views of the edge portions of two connected edge modules of FIGS. 6A and 6B.
Figure 7B:
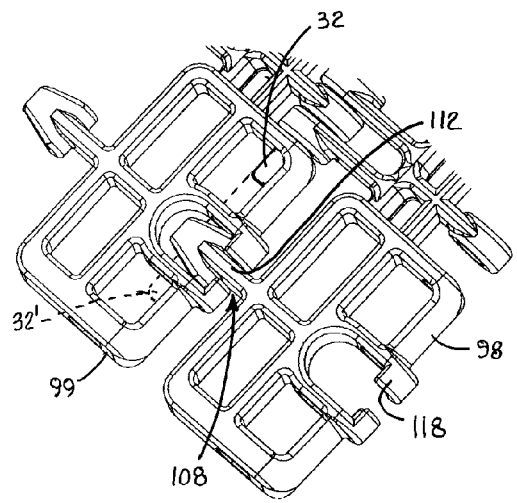

As shown in FIGS. 7A and 7B, the pivot end 114 is received in the receptacle 96 of an adjacent edge module with the arm 112 residing in the slot 108. The protrusions 106, 107, which are arcuate segments, have extended portions 118, 119 at one end and surround enough of the pivot end 114 to retain it in place in the receptacle while the belt is in tension. Although the extended portion 119 on the outer side wall 101 is shown on the top side of the module and the extended portion 118 on the inner side wall 100 is shown on the bottom side, making the arcuate protrusions circumferentially offset about the hinge axis, the protrusions could be circumferentially aligned. The hinge axis 120 through the lateral passageway formed by the aligned apertures 30 in the interleaved hinge elements 26, 27 in the main portions 92 of the joined, adjacent modules is aligned with the pivot axis 121 of the pivot end 114. Unlike the pivot end 62 in the module 10 of FIG. 1, the pivot end 114 has an aperture 122 coaxial with the hinge axis 120 and the pivot axis 121. Apertures 124 through the side walls 100, 101 of the receptacle 96 are also aligned with the hinge and pivot axes at the hinge joint. The apertures in the pivot end and the side walls of the receptacle facilitate entry of the hinge rod 32 through the edge portion 94 and into the lateral passageway. The converging sides 116, 117 of the pivot end also aid in guiding the hinge rod into the apertures without catching. And, as shown in FIG. 7B, even though the hinge rod need extend from the main portion only slightly into the edge portion 94, the apertures in the pivot end and the side walls of the receptacle accommodate growth of a wet rod 32' out to a position closer to the outside edge 99 of the module 90. A concave inner surface 126 on the segmented elongated link end 98 nestles the end of the hinge rod that extends into the edge portion 94 of the module 90.

Figure 8:
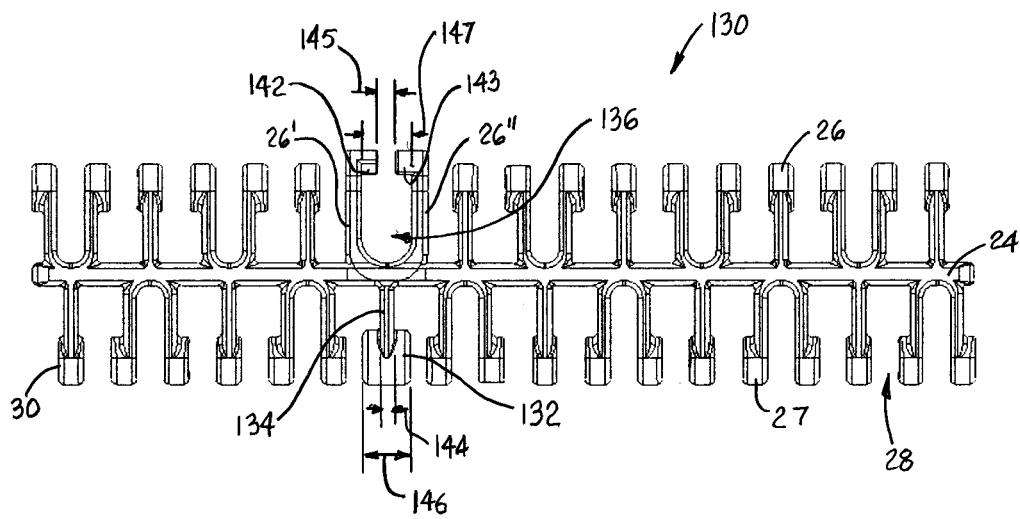
FIG. 8 is a top plan view of an internal module embodying features of the invention and usable in a conveyor belt as in FIG. 5.
Figure 9:
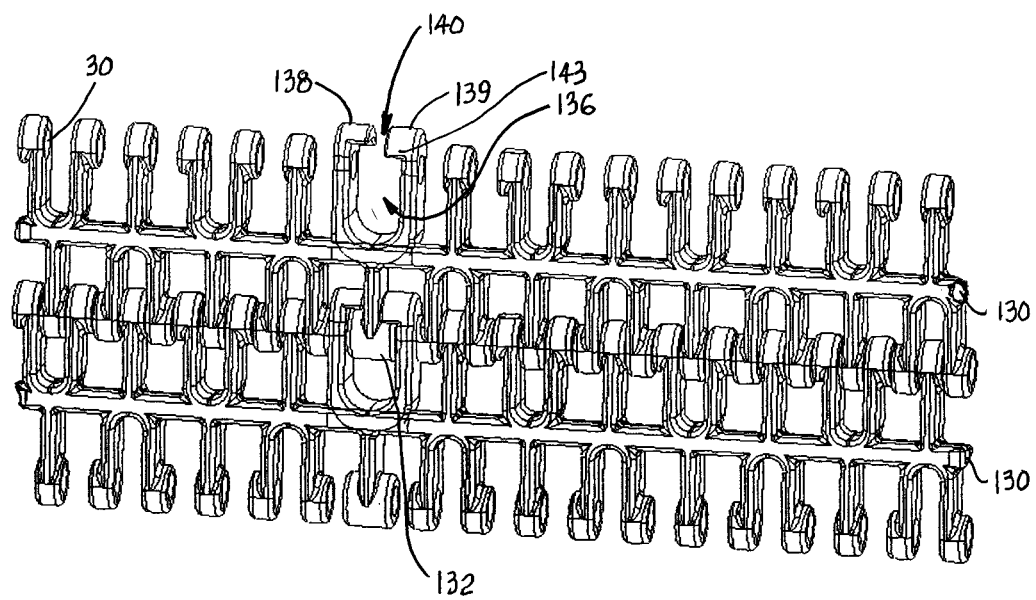
FIG. 9 is an axonometric view of portions of two internal modules as in FIG. 8.

An interior belt module 130 usable in the interior of a belt row in place of the interior modules 11 in the conveyor belt shown in FIG. 5 is illustrated in FIG. 8 and with another internal module in FIG. 9. The module 130 includes hinge elements 26, 27 along each end with aligned hinge-rod apertures 30, but no edge portion as in an edge module. The hinge elements are spaced apart laterally across spaces 28 between consecutive hinge elements. One of the hinge elements 27 has an enlarged pivot end 132 at the distal end of an arm 134 extending longitudinally outward from the module's lateral rib 24. Consecutive hinge elements 26', 26" on the other end of the module are separated by a space in the form of a horseshoe-shaped receptacle 136. Laterally confronting protrusions 138, 139 at the distal ends of the pair of hinge elements extend from the hinge elements toward each other. A narrow slot 140 between the protrusions open into the receptacle.

The enlarged pivot end 132 is received in the receptacle 136 of an adjacent edge module with the arm 134 residing in the slot 140. Like the protrusions 106, 107 in the edge module of FIG. 6B, the confronting arcuate protrusions 138, 139 hook the enlarged pivot end in place in the receptacle. The arcuate protrusions are circumferentially offset from each other with extended portions 142, 143 at opposite ends, just as for the extended portions 118, 119 in the edge module of FIGS. 7A and 7B, to help hook unconnected ends of the belt together during field-splicing when tension in the belt created as slack is removed from the returnway is pulling the ends apart. Other than not being shown with converging sides like the pivot end 114 in FIG. 6B, the cylindrical pivot end 132 is similarly inserted into the receptacle 136 from the top or bottom of the module with the arm 134 through the slot 140 during belt assembly, just as for the pivot end and receptacle of FIGS. 6 and 7. Then adjacent belt rows are pulled in opposite directions. The enlarged pivot end is pulled against the protrusions, their arcuate inner surfaces nestling the pivot end, with the apertures of the interleaved hinge elements laterally aligned in registration for easier hinge-rod insertion. To accommodate the connection of the pivot end with the receptacle, the lateral width 144 of the arm 134 is less than the lateral width 145 of the slot 140, which is less than the lateral width 146 of the pivot end 132, which is less than the lateral width 147 of the receptacle 136. This is the same relationship of lateral widths as for the pivot ends and receptacles of FIG. 1 and FIGS. 6 and 7. And, although the enlarged pivot end and mating receptacle are shown in FIGS. 8 and 9 in internal belt modules, they could also be formed in the main portion 92 of the edge modules 90 of FIGS. 6A and 6B.

Thus, a belt can be spliced on a conveyor in the field by first pulling the unconnected ends together against back tension until the ends overlap. The ends of the belt are hooked together by first inserting the enlarged pivot ends along one end of the belt into the receptacles along the other end from the top or bottom of the belt. Then the ends of the belt are released to allow tension in the belt to pull the arms of the pivot members through the slots opening into the receptacles until the enlarged pivot ends rest against the inner surfaces of the protrusions with the apertures of the interleaved hinge elements and the pivot ends aligned to form a lateral passageway. Finally, a hinge rod in inserted into and pushed through the lateral passageway to splice the two ends of the belt together on the conveyor.

The details of the specific examples are used to help describe the invention. The scope of the invention is defined by the following claims.

What is claimed is:
1. A conveyor belt module comprising:
a first end and a longitudinally opposite second end, each extending laterally from a first side to a second side;
a first set of hinge elements spaced apart laterally along the first end with spaces between laterally consecutive hinge elements and having aligned apertures forming a first lateral passageway extending from the first side to the second side;
a second set of hinge elements spaced apart laterally along the second end with spaces between laterally consecutive hinge elements;
wherein at least one pair of consecutive hinge elements of the first set has confronting lateral protrusions extending laterally toward each other from the distal end of each of the consecutive hinge elements, wherein the lateral protrusions are in confronting relationship to form a narrow slot opening into the space between the pair of laterally consecutive hinge elements;
wherein at least one hinge element of the second set has an arm extending longitudinally to an enlarged pivot end, wherein the lateral width of the arm is less than the lateral width of the slot, which is less than the lateral width of the enlarged pivot end, which is less than the lateral width of the space.

2. A conveyor belt module as in claim 1 wherein the second set of hinge elements has aligned apertures forming a second lateral passageway extending from the first side to the second side and wherein the enlarged pivot end encompasses the aperture through the at least one hinge element of the second set.

3. A conveyor belt module as in claim 1 wherein the enlarged pivot end has sides that converge with distance from the arm.

4. A conveyor belt module as in claim 1 wherein the confronting lateral protrusions are circumferentially offset from each other.

5. A conveyor belt constructed of a series of conveyor belt modules as in claim 1 hingedly connected end to end by hinge rods received in the aligned apertures of interleaved first and second sets of hinge elements of adjacent conveyor belt modules received in the spaces of adjacent conveyor belt modules with the enlarged pivot end retained in the corresponding space by the lateral protrusions of an adjacent conveyor belt module.

6. A conveyor belt module as in claim 1 wherein the conveyor belt module comprises a main portion and an edge portion extending laterally from the main portion to an outside edge at the second side for forming a belt edge and wherein the at least one pair of consecutive hinge elements of the first set and the at least one hinge element of the second set are formed in the main portion.

7. A conveyor belt module as in claim 6 wherein the main portion includes lateral ribs joining the edge portion to the main portion.

8. A conveyor belt module as in claim 1 wherein the conveyor belt module comprises a main portion and an edge portion extending laterally from the main portion to an outside edge at the second side for forming a belt edge and wherein the at least one pair of consecutive hinge elements of the first set and the at least one hinge element of the second set are formed in the edge portion.

9. A conveyor belt module as in claim 8 wherein the main portion includes lateral ribs joining the edge portion to the main portion.

10. A conveyor belt module as in claim 8 wherein the space between the at least one pair of consecutive hinge elements of the first set and the enlarged pivot end of the at least one hinge element of the second set are positioned proximate the outside edge of the edge portion.

11. A conveyor belt module as in claim 1 wherein the space between the at least one pair of consecutive hinge elements of the first set and the pivot end of the at least one hinge element of the second set are aligned longitudinally.

12. A conveyor belt constructed of a series of rows of one or more rows of conveyor belt modules as in claim 1 connected by hinge rods received in the aligned apertures of interleaved hinge elements of the first and second sets between each row.

13. A method for splicing a conveyor belt together on a conveyor, comprising:
    pulling the opposite ends of a conveyor belt together until the ends overlap;
    hooking enlarged pivot ends along one end of the conveyor belt into receptacles along the opposite end to align apertures in interleaved hinge elements along the ends to form a lateral passageway by inserting the enlarged pivot ends into the receptacles from one of the top or bottom of the conveyor belt; and
    releasing the ends of the conveyor belt to allow tension in the conveyor belt to pull the enlarged pivot ends against the inner surfaces of protrusions bounding the distal ends of the hinge elements forming the receptacles;
    inserting and pushing a hinge rod through the lateral passageway to connect the ends of the belt together.

14. A conveyor belt module comprising:
    a first end and a longitudinally opposite second end, each end extending laterally from a first side to a second side;
    a first set of hinge elements spaced apart laterally along the first end with spaces between laterally consecutive hinge elements and having aligned apertures forming a first lateral passageway extending from the first side to the second side;
    a second set of hinge elements spaced apart laterally along the second end with spaces between laterally consecutive hinge elements;
    wherein a hinge element of the first set has an enlarged distal pivot end forming a narrow slot with a consecutive hinge element of the first set opening into the space between the pair of laterally consecutive hinge elements of the first set;
    wherein a hinge element of the second set has an arm extending longitudinally to an enlarged pivot end, wherein the lateral width of the arm is less than the lateral width of the slot, which is less than the lateral width of the enlarged pivot end, which is less than the lateral width of the space.

15. A conveyor belt module as in claim 14 wherein the hinge element of the first set having an enlarged distal pivot end and the consecutive hinge element of the first end have confronting lateral protrusions that form the narrow slot.

* * * * *